United States Patent [19]

Stevens et al.

[11] Patent Number: 4,744,328
[45] Date of Patent: May 17, 1988

[54] SEALANT COMPOSITIONS AND METHODS FOR USE IN DETECTING EQUIPMENT TAMPERING

[76] Inventors: D. Lynn Stevens, 55 Matterhorn, Summit Park; Terry K. Stevens, 3364 Cummings Rd.; Charles C. Cameron, 2135 Cresthill Dr., both of Salt Lake City, all of Utah

[21] Appl. No.: 684,526

[22] Filed: Dec. 21, 1984

[51] Int. Cl.⁴ .................. G01D 13/00; G09F 3/00; F16L 35/00

[52] U.S. Cl. .................. 116/200; 116/212; 285/80; 292/307 R; 427/7

[58] Field of Search .......... 116/200, 201, 208, 212; 206/807; 215/201; 292/307, 307 B; 403/27; 285/130, 80; 427/7

[56] References Cited

U.S. PATENT DOCUMENTS

| | | | |
|---|---|---|---|
| 733,731 | 7/1903 | Mooney et al. | 285/80 |
| 790,142 | 5/1905 | Lichetti | 70/DIG. 56 |
| 802,436 | 10/1905 | Van Order | 73/201 |
| 1,305,132 | 8/1920 | Ashley | 79/3 |
| 1,473,751 | 11/1923 | Walker | 70/230 |
| 1,480,472 | 1/1924 | Sauton | 285/30 |
| 1,553,188 | 9/1925 | Sauton | 292/307 R |
| 1,579,954 | 4/1926 | Sauton | 285/30 |
| 1,612,420 | 12/1926 | Davis | 70/230 |
| 1,678,955 | 7/1928 | Rockenbauer | 285/80 |
| 1,814,412 | 7/1931 | Rutten | 285/80 |
| 2,041,421 | 5/1936 | Loehde | 70/122 |
| 2,081,627 | 5/1937 | Heinrich | 40/2.2 |
| 2,104,204 | 1/1938 | Martinez et al. | 292/307 |
| 2,113,306 | 4/1938 | Martinez et al. | 247/2 |
| 2,142,048 | 12/1938 | Davis et al. | 70/440 |
| 2,360,325 | 10/1944 | Higbee | 292/307 R |
| 3,320,198 | 5/1967 | Hill | 260/29.6 |
| 3,406,285 | 10/1968 | Scorgie et al. | 374/4 |
| 4,196,107 | 4/1980 | Jones et al. | 524/522 |
| 4,326,740 | 4/1982 | Guiler | 292/307 B |
| 4,372,593 | 2/1983 | Kesselman | 292/307 B |
| 4,422,674 | 12/1983 | Steuernagle | 285/30 |
| 4,471,982 | 9/1984 | Nielson | 292/307 B |
| 4,503,186 | 3/1985 | Sugio et al. | 525/392 |

FOREIGN PATENT DOCUMENTS

| 3015014 | 11/1980 | Fed. Rep. of Germany | 428/916 |
|---|---|---|---|
| 5005 | 3/1903 | United Kingdom | 285/80 |

OTHER PUBLICATIONS

Guard-Nut Security Fasteners, Jul. 1983, American Meter Division, Singer-Gas Meters.

Primary Examiner—William A. Cuchlinski, Jr.
Assistant Examiner—W. Morris Worth
Attorney, Agent, or Firm—Workman, Nydegger & Jensen

[57] ABSTRACT

Sealant compositions and methods which are particularly adaptable for use in detecting movement between two or more adjacent surfaces. The preferred sealant composition of the present invention is comprised of a paint base, such as a latex floor enamel, to which is added a thickening agent. One suitable thickening agent is a texture paint containing silica and silicates. When applied to a surface or series of surfaces, the sealant composition dries to a putty-like consistency. When spread over a portion of two adjacent surfaces and the joint therebetween, the paint forms a smooth continuous surface. If the two surfaces are moved with respect to one another, however, an irreparable tear occurs in the paint surface; as a result, movement between the two surfaces is readily detected. This sealant composition is particularly useful in detecting tampering with utility meters.

34 Claims, 1 Drawing Sheet

SEALANT COMPOSITIONS AND METHODS FOR USE IN DETECTING EQUIPMENT TAMPERING

BACKGROUND

1. The Field of the Invention

The present invention relates to sealant compositions and methods which are particularly useful in detecting movement between adjoining surfaces. More particularly, the present invention relates to paint-type products which can be used to detect tampering with secured equipment, such as utility meters.

2. The Prior Art

In a wide variety of settings it is desirable to detect movement between two adjoining surfaces. This is particularly true when there is a desire to secure a piece of equipment, but it may also be true in other situations such as when it is necessary to maintain a particular setting or calibration on a piece of equipment. In order to detect whether a piece of equipment has been disturbed or tampered with, it is often desirable to apply to the equipment means capable of detecting tampering or movement. For example, a perennial need in the utility industry has been the need to detect when utility facilities have been tampered with or disturbed.

A particularly serious problem in the utility industry relates to the diversion, such as by theft, of utility service. Millions of dollars each year are lost because electric, gas, water, and telephone service is diverted and used, but no compensation for such use is paid. The incidents of utility theft have increased rapidly over the last several years with the relatively rapid increase in the cost of utility service, particularly electric and gas service.

It has been found by utility companies that customers of all types have on occasion attempted to divert utility service. Individual customers of all descriptions and at all economic levels, as well as commercial and industrial establishments, have attempted to divert service.

Diversion and theft of service seriously impacts utility companies financially. For example, gas distribution and transmission companies typically find that approximately one and one half percent (1½%) of their gas supply is "lost and unaccounted for." This figure can at times reach as high as three percent (3%) of gas supplies. Even at the 1½% level, however, lost and unaccounted for gas represents many millions of dollars each year. Furthermore, it is known that a significant portion of this gas is gas which is intentionally diverted or stolen.

Diverted utility service can also represent a very serious safety hazard. Diversion of gas or electric service by a person not adequately trained in the handling of those types of energy can easily cause damage to the person diverting the service, as well as to other individuals and to property. Each year, numerous explosions and fires are caused by natural gas which has been improperly diverted by an unknowledgeable individual. Electric power and even water can also cause serious personal injury and property damage, if handled improperly.

As a result, utility companies have gone to great lengths to attempt to stop or prevent service diversion. Utility service personnel are specially trained to detect tampering with utility facilities. Many companies have hired specially trained investigators and attorneys to locate individuals who are diverting service, to prosecute them for theft, and to attempt to collect from them the value of the services they have taken.

All of these measures clearly are taken at great cost to utility companies. However, in view of the many millions of dollars in service diverted each year, and the serious safety hazard caused by diversion of utility service, such steps are considered justifiable.

In addition to employing extensive staffs, utility companies and others seeking to secure equipment, have developed and used various devices in order to prevent or detect tampering with facilities. These devices have been in use since at least the early part of this century and have taken a variety of forms. One of the oldest devices, but one which is now regaining favor within the utility industry, consists of a simple piece of wire with a soft metal, such as lead, fittingly connected to one end.

The wire can be threaded through various parts of the meter, such as lock nuts and connectors, which have holes which can accommodate such a wire. The free end of the wire is then run back into a space within the lead fitting and a special tool presses the fitting to secure both ends of the wire within the lead fitting. The tool may be constructed so as to leave a particular design on the fitting which is not easily duplicated.

Several problems have been encountered in the use of such a device. One problem, which is a problem shared by all existing devices, is that the presence of the wire is readily detectable by a potential tamperer. Since the wire is obvious, a person intending to tamper with a meter can easily make plans to deal with the wire. For example, it may be possible to cut the wire near the lead fitting and later replace the wire within the fitting so that the meter tampering is not obvious.

It is also necessary to thread such wires through all attachments and connections which could potentially be removed. Since some of these attachments are not designed to allow the positioning of the wire through them, the meter will still be susceptible to tampering even though the potential options as to how to do the tampering may be limited.

An additional problem is that this type of wire connector is readily available; this allows a potential tamperer to remove one such wire, and when the modification of the meter is complete, to replace it with another similar wire in its place. As a result of these problems, other means of securing meters have been developed.

Another existing means commonly used by the utility industry is a tamper indicator collar which can be placed around the main connector nuts which help attach a gas line to the meter. The collars generally consist of two nearly identical parts which can be interlocked by snap-catches located on each part of the collar. Once the collar is put in place around the connector nuts, it cannot be removed without breaking the collar. In order for a person to tamper with the connector nuts of the meter, he would be required to break the collars, thus alerting a meter reader that meter tampering had taken place.

Many of the same problems pointed out with reference to the wire remain in using this type of collar. The collar is readily observable by the tamperer, thus allowing him to design alternative means of meter tampering. Collars are only designed for certain sizes of nuts, such as the main connector nuts. Therefore, nuts and connections of different sizes must either be left exposed or be secured by an alternative means.

A serious drawback in using wires and collars is the cost of securing a meter. As mentioned above, in order to adequately secure a meter, it is typically necessary to use both wires and collars. A typical residential meter would require at least two collars and one wire. The cost, including labor, to seal a meter in the field using two collars and one wire has recently been estimated to be in excess of $3.50.

When it is realized that there are approximately forty-five million gas meters and forty million gas regulators, together with an additional sixty million electric and forty million water meters, in the United States alone, it can be seen that the investment to secure a significant portion of these meters using existing devices would be astronomical. Numerous other types of devices have been used in an attempt to secure utility meters. These devices include simply placing the meter into a locked box. These boxes may have locks which must be opened using a special tool. Other devices simply include placing a padlock on a portion of the meter or adding tubes, rods and pipes in such a manner as to discourage tampering.

The problems discussed above remain in all of these attempts to make meters, and other equipment, tamper resistant. As mentioned, one primary consideration is cost. Each meter would cost $3.50 or more to secure using typically known devices. When considered from the point of view of even a small to intermediate size utility company, the investment could be on the order of several million dollars. Even if such an investment were made, the utility's meters would not be totally secure.

All of these prior art devices are obvious to the potential tamperer allowing him the opportunity to attempt to circumvent the devices. In addition, these same basic devices have been well known for more than 50 years, yet utility service diversion currently continues at an ever higher rate. It is clear, therefore, that even with a large investment in equipment, man power, and devices, the goal of preventing meter tampering and diversion of service has eluded the utility industry.

It is apparent that what is needed in the art are apparatus and methods for effectively, yet inexpensively, detecting and thereby preventing, equipment tampering. Particularly, it would be an advancement in the art if equipment could be easily secured in the field without the use of various types of expensive devices, such as connector nut collars and wires with lead seals. It would be a further advancement in the art if a means could be developed which would indicate that equipment has been tampered with without providing the tamperer advance notice of the way in which the equipment is secured. It would also be an advancement in the art if a method for securing meters were available which was internally secure in that a tamperer could not easily replace the device or means used to secure the meter. Such an invention is disclosed and claimed herein.

BRIEF SUMMARY AND OBJECTS OF THE INVENTION

The present invention is directed to unique sealant compositions and methods which can be used to detect tampering with equipment or movement between two or more adjacent surfaces. A paint-type composition within the scope of the present invention is formulated so that it can be applied by conventional means such that when it is applied to two adjoining surfaces and those surfaces are moved with respect to one another, a readily detectable break in the paint occurs.

The paint composition of the present invention is formulated so that, if desired, it matches exactly the color and surface characteristics of the surfaces to which it is applied. Thus, a typical paint base and typical paint pigments can be used. The composition, however, also includes a thickening agent added to the paint base. The presently preferable thickening agents include silicon and silicates. Such a thickening agent gives the paint a putty-like consistency when applied to a surface and allowed to dry. However, once the composition has dried, it is not readily noticeable if the composition has been tinted to the color of the surface to which it is applied.

Once the paint composition is in place, it acts as an effective, yet inexpensive, tamper indicator. The paint can be placed around all of the moveable joints on a a piece of equipment, such as a meter. When any of these surfaces are moved with respect to one another, such as when a nut or screw is turned, a break occurs in the putty-like paint surface. This break is readily noticeable, and at the same time irreparable. A tamperer will be unable to replace or repair the broken paint surface around the nut or connector, and as a result, the tampering will be readily detectable.

This paint composition can be incorporated into a system whereby the paint can be easily applied and at the same time control of the paint can be maintained. One method of accomplishing such control is to package the paint composition in sealed containers which hold only enough paint to secure a single meter. Each package then includes a control number which is recorded along with the location and description of the meter to which it was applied. The package can be configured to allow ease of application of the paint. In addition, each package of paint can be made available to a user at a fraction of the cost of the existing means for securing equipment against tampering.

It is, therefore, a general object of the present invention to provide a method of effectively detecting movement between adjoining surfaces.

More particularly, it is a general object of the present invention to provide a method of effectively detecting tampering with equipment, such as utility meters.

It is also an object of the invention to provide a method of detecting tampering which is inexpensive and which is simple to apply and use.

It is a further object of the invention to provide a method for detecting tampering which is not easily detectable in advance by the person doing the tampering and which cannot be easily replaced or repaired once the tampering has been done.

It is another object of the invention to provide a method for detecting tampering which is flexible and which can be used on all types of equipment and on all types of connection on and within that equipment.

It is still a further object of the invention to provide a sealant composition which is adaptable for use as a means of detecting equipment, including, utility meter tampering and which has the characteristics described in the above objects of the invention.

DETAILED DESCRIPTION OF THE PREFERRED EMBODIMENTS

The preferred embodiments of the present invention are unique paint formulations, together with a system of applying and using such paint formulations, which are particularly adaptable for use in protecting against and detecting tampering with or movement of equipment. The paint is formulated so that when it is painted over two adjoining surfaces, any significant movement between those surfaces causes the paint surface to be irreparably torn. The movement between the surfaces, therefore, can easily be detected.

The paint's usefulness in detecting tampering is clear. If a part of a piece of equipment treated with the paint formulation is moved, the paint will be torn leaving an obvious and easily detectable scar.

GENERAL DISCUSSION

It is presently preferred that the paint have a typical commercially available white latex paint base. A color additive will then be carefully chosen and mixed into the paint base so that, if desired, the paint when applied to an already painted surface will be indistinguishable from that surface. This is desirable in assuring that the tamper detection system will not be noticed in advance by a tamperer.

Alternatively, it may be desirable in some instances to choose the paint color so that it contrasts with the surface to which it is applied. This is particularly desirable when the paint is intended to serve as a warning to the potential user of tamperer.

Added to the paint base is a thickening agent; this thickening agent contains a significant amount of silica and silicates. These materials, when added to the paint base, tend to give the paint a putty-like texture when applied to a surface and allowed to dry. The appearance of the dry paint mixture is, however, indistinguishable from the appearance of the other paint on the surface. If used outdoors, the paint composition will fade at the same rate as the paint already in place and is durable and resistant to weather. Furthermore, the paint composition, like the paint already in place on the equipment, will not peel.

One of the unique features of the paint, as was mentioned briefly above, is the way in which it behaves when adjoining surfaces to which it is applied are moved with respect to one another. As the paint dries, it forms a connecting surface which links two or more adjacent surfaces. Since the paint mixture has a putty-like texture, however, it tends to tear when the two surfaces are moved with respect to one another.

Also because the paint is much thicker than a conventional paint, the tear leaves a deep and readily observable scar. Because of the depth and extent of the tear and the resulting scar, it would be virtually impossible to repair the paint surface to the point that the movement between the two surfaces could be disguised.

Figure 1:
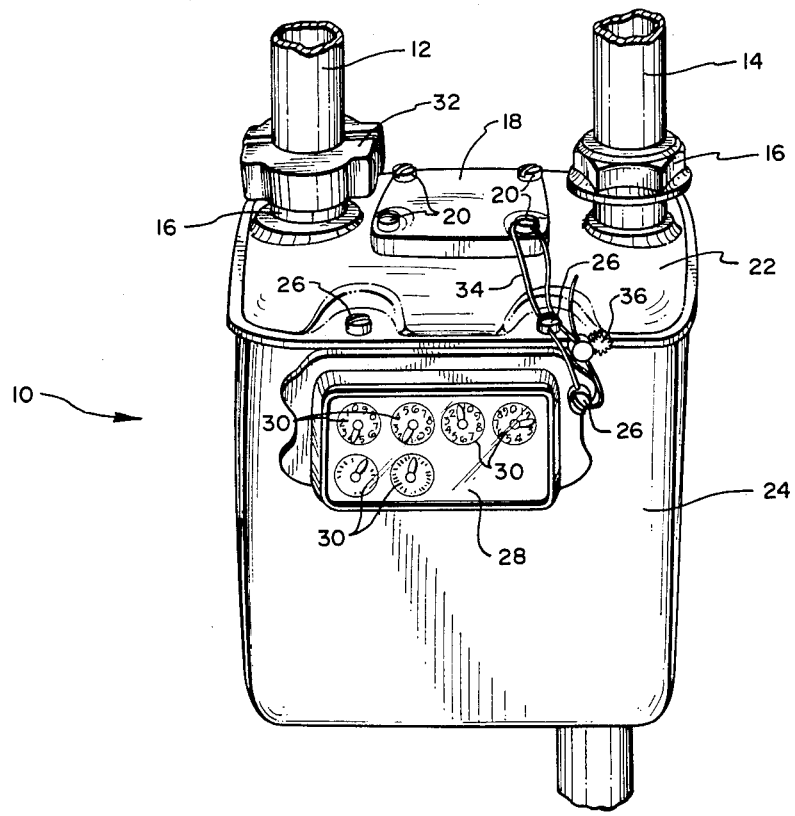
FIG. 1 is a front perspective view of a typical natural gas meter partially secured using a prior art collar on a connector nut and a prior art wire through the small attachment nuts.

The present invention can be more fully understood with reference to the drawings wherein like parts are designated with like numerals throughout. Referring to FIG. 1, a conventional gas meter is illustrated. This meter is shown as being partially secured using prior art methods and devices. The gas meter is generally designated 10 and is connected to an inlet gas line 12 and an outlet gas line 14. The lines are secured to the meter 10 by main connector nuts 16. Also included on meter 10 is a plate 18 which can be removed in order to view the interior of the meter 10. Plate 18 is secured in place by screws 20, and the entire head 22 of the meter 10 is secured to the base 24 of meter 10 using bolts 26. Meter 10 also contains a face 28 containing a plurality of dials 30.

FIG. 1 illustrates some common prior art methods of securing a gas meter. One method is placing a collar 32 around main connector nuts 16. Collar 32 is typically made of a frangible plastic and is formed in two mirror-image halves. The means of connecting the two halves typically comprises snap-catches located inside the collar. Once the two collar halves are snapped together around main connector nuts 16, the only way to remove the collar is to break it. Thus, any attempt to tamper with the connector nuts is readily detected because of the obvious damage to the collar.

FIG. 1, in addition, illustrates the general method of using the prior art wire with a lead seal. A wire 34 is shown in place having been threaded through a screw 20 and two bolts 26. The ends of wire 34 are then secured within lead seal 35 which is pressed with a pair of pliers or other similar tool to lock wire 34 in place.

A typical prior art method of securing meter 10 was to place a pair of collars 32 on both of the main connector nuts 16 and to thread wire 34 through a screw 20 and bolts 26. As mentioned above, even using this expensive and complex method, tampering continues.

Figure 2:
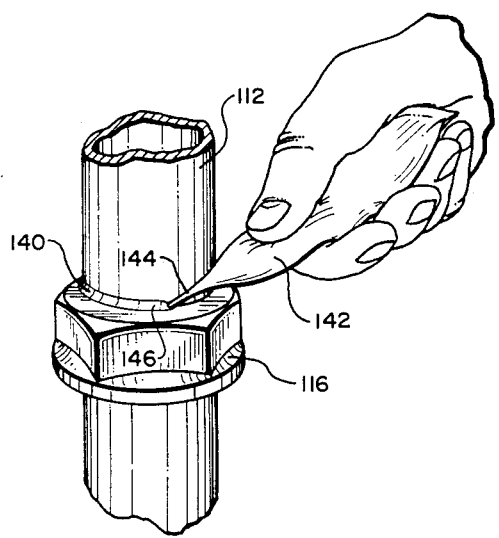
FIG. 2 is a front perspective view of a connector nut on a gas meter with the joint between the nut and the gas line being painted using the paint and the system of the present invention.
Figure 3:
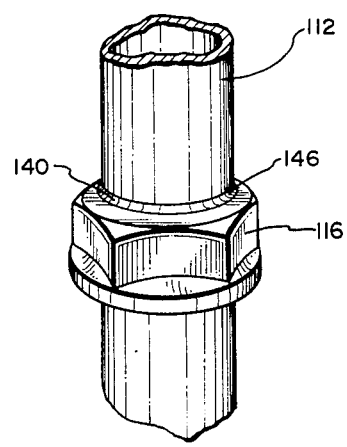
FIG. 3 is a front perspective view of a connector nut having been painted using the present invention.
Figure 4:
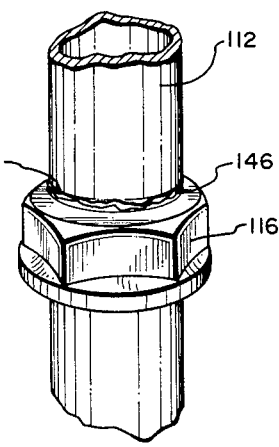
FIG. 4 is a front perspective view of the connector nut illustrated in FIG. 3 having been moved with respect to the gas line so that the paint surface has been disturbed and broken.

FIGS. 2, 3, and 4 in contrast, illustrate the simple, inexpensive and effective method of securing meters according to the current invention. FIGS. 2, 3, and 4, for the purpose of illustration show the current invention as it would be used on the joints adjacent to a main connector nut 116 on a gas meter.

It will be appreciated that the current invention is capable of use on any device, whether used in the utility industry or otherwise, where it is desirable to detect movement between two adjoining surfaces. An example of a possible use outside the utility industry would be where it is desirable to detect whether or not a particular setting has been changed on a piece of scientific equipment. Other uses for the current invention could certainly be found within the military, the shipping industry, or in any other situation where security is important.

The current invention can be used in these and many other situations. However, it is expected that the current invention will certainly be capable of broad immediate application within the utility industry, and therefore, a utility setting is used to illustrate the usefulness of the current invention.

FIG. 2 illustrates the paint composition of the current invention being applied to the joint 140 between an inlet line 112 to a gas meter and the gas meter's main connector nut 116. It is expected that one excellent way in which to package and use the paint composition of the current invention (at a remote site) would be to put it into flexible plastic tubes containing only enough paint to seal the joints on a single meter. Tubes of this type are well known and are currently used to contain adhesives, lubricants, and other similar substances.

This type of tube 142, as illustrated in FIG. 2, could be molded to include a nozzle 144 which is particularly adaptable for neatly and precisely applying the paint composition 146 to the joints of a utility meter. Thus, the tube would be opened by cutting or trearing off the tip of nozzle 144. This would then allow paint composition 146 to be squeezed out of tube 142. As illustrated in FIG. 2, paint composition 146 can be easily applied to the joint 140 between connector nut 116 and inlet line 112.

Once paint composition 146 is in place, it is difficult to detect and is certainly not obvious to the casual observer if it is the same color as the underlying surface. FIG. 3 illustrates paint composition 146 once it has been put in place and dried. As illustrated in FIG. 3, the paint composition 146 along joint 140 of nut 116 will not readily be noticed. This provides a distinct advantage over the prior art.

Essentially all of the prior art tamper detection devices are readily observable in advance by a potential tamperer. Thus, such an individual can make a conscious decision as to whether he would destroy the tamper-detection device and risk being discovered, or whether he would attempt to use some undetectable means of tampering. In using the paint composition 146 of the current invention, such an individual will not realize the prior existence of a tamper indicator and as a result will not be able to easily avoid detection.

FIG. 4 illustrates the appearance of paint composition 146 in the event that nut 116 has been moved with respect to inlet line 112. The movement will cause deep and irreparable tears in the surface of paint composition 146. Any significant movement between nut 116 and inlet line 112 will cause breaks in the putty-like paint composition 146. Thus, it will not be possible to significantly modify the meter by moving the inlet line 112 or the nut 116 without being detected.

It would be very difficult for a person not having direct access to paint composition 146 to adequately repair the tears caused by moving the meter parts. In the event an attempt to repair the paint were made, however, there would exist several severe obstacles. First, it would be required that the paint color be matched exactly with the pigment in paint composition 146. It is unlikely that those not connected professionally with the paint industry would be able to adequately match the paint colors to avoid detection.

Next, it would be necessary to remove the old paint composition 146 and to replace it with the new mixture. However, it would be difficult to duplicate the surface characteristics caused by applying the paint using tube 142 and nozzle 144. It would be even more difficult to duplicate the putty-like characteristics of paint composition 146. As a result, it is extremely unlikely that detection could be avoided by most tamperers.

As an additional protection against allowing a tamperer to cover up his tampering, it is possible to add one or more additional components to paint composition 46. For example, it may be possible to add a component which is only visible under ultraviolet or infrared light. One such component is zinc oxide which is visible under ultraviolet light. As a result, even if it were possible to visually repair and replace the damaged paint composition 146, the need for an additional component would not be readily apparent. If the paint containing the additional component were painted over, this would be easily detected by viewing the joint under infrared or ultraviolet light, as the case may be.

An additional advantage of the current invention is the fact that the paint composition may be incorporated into a system which assures internal security. It is obvious that if large containers of paint composition 146 were available, the potential for a portion of the contents to be stolen or lost would be great. In addition, the paint may be lost or stolen without the loss being realized. Since it only takes between $\frac{1}{8}$ and $\frac{1}{4}$ of an ounce of paint to secure a utility meter, losing even a relatively small quantity of paint could potential defect the effectiveness of a security program.

Therefore, it is anticipated that the paint composition of the current invention would preferably be packaged in small individual tubes. These tubes may contain individual control numbers and when a meter is treated with the paint composition, the location of the meter and the control number on the paint tube will be recorded.

In addition, with control numbers, all paint tubes can be logged out and logged back in when they are empty, and tubes can contain only enough paint to secure a single meter. This procedure allows extremely tight control to be maintained over the distribution of the paint composition and the theft or loss of even a single small tube would be immediately detected.

THE CHEMICAL COMPOSITION

As discussed above, the present invention is a unique paint composition which is particularly useful in detecting movement between adjacent surfaces. It is presently preferred that the paint composition be comprised of two primary constituents. The first constituent is a typical paint base. A paint base such as a latex floor enamel has been found to be acceptable.

To the paint base is added a thickening agent. The thickening agent is chosen so that the paint dries to a putty-like consistency. The thickening agent can be any substance which is both compatible with the paint base and which produces the desired characteristics in a dried paint surface. To these components is added the necessary pigments to allow the paint color to match exactly the surface to which it is applied.

One paint base which has been found to be acceptable is a latex floor enamel manufactured by Fuller-O'Brien Division of the O'Brien Corporation. The paint base is generally comprised of a pigment and a vehicle. This particular paint base employs a titanium dioxide pigment. The pigment is classified as titanium dioxide Type IV by the American Society of Testing and Materials (ASTM) and is generally suitable for use in an exterior grade paint. This pigment is added to a vehicle, which is generally comprised of an acrylic resin, glycols, and water.

The latex floor enamel paint base mentioned above may be comprised of from about 16% to about 30% titanium dioxide pigment, with the remainder being vehicle. The pigment in the base is comprised essentially of titanium dioxide Type IV. The vehicle is generally comprised of between about 18% and about 40% acrylic resin, and from about 3% to about 9% glycols, with the remainder being water.

As mentioned above, a thickening agent is then added to the paint base. One thickening agent which has been found to be acceptable is a texture paint manufactured by Fuller-O'Brien Division of the O'Brien Corporation. The texture paint is comprised of a titanium dioxide pigment, calcium carbonate, silica and silicates, a resin of vinyl acetate, ethylene or vinyl chloride, and water.

One acceptable pigment used in the texture paint is titanium dioxide Type I (as classified by ASTM) comprising from about 2% to about 5% of the texture paint. Between about 9% to about 13% calcium carbonate is added, together with about 40% to about 60% silica and silicates, and from about 3% to about 7% resin. The remainder of the texture paint is comprised essentially of water.

The paint base and the texture paint are then combined. The ratio of those components is varied in order to produce the desired characteristics. For example, for use as a utility meter tamper detection mechanism, it has been found that a mixture of three (3) parts paint base and one (1) part texture paint will produce an ideal surface. However, the paints could be combined in any proportion from essentially all paint base to essentially all texture paint depending on the surface characteristics desired and the degree of observable scar necessary to detect tampering.

It will also be appreciated that other means of thickening the paint composition could be employed. For example, it may be possible to produce an appropriate paint composition by simply adding silicon and silicates directly to a paint base in the form of an emulsion in order to give a thickened paint with certain desirable characteristics.

What is important is that a paint composition within the scope of the present invention should have substantially the same wear characteristics as the paint on the underlying surfaces to which it is applied. As discussed briefly above, the paint should preferably fade at the same rate, and if used outside, should not peel. For example, if used on utility meters located in the outside environment, it would be critical that the paint be fully weather resistant.

EXEMPLARY FORMULATIONS

The following examples are given to illustrate chemical compositions with the scope of the present invention, but these examples are not intended to limit the scope of the present invention.

EXAMPLE 1

A paint composition within the scope of the present invention was made by combining the following components in the indicated percentages.

| Components | Percentage |
| --- | --- |
| Latex enamel No. 631-91 (manufactured by Fuller-O'Brien) | 75% |
| Texture paint comprised of the following components added in the indicated percentages: | 25% |
| Titanium Dioxide Type I | 3.4% |
| Calcium Carbonate | 11.4% |
| Silica and silicates | 46.2% |
| Vinyl acetates/ethylene/vinyl chloride resin | 4.6% |
| Water | 34.4% |

These components were combined to form a paint composition which, when applied to a surface, dried to a putty-like consistency. The paint composition of Example 1 was applied to a series of gas meters and was found capable of indicating tampering with those gas meters. Moreover, the paint composition had acceptable wear characteristics in the areas of resistance to peeling, fading, and resistance to weather.

EXAMPLE 2

A paint composition within the scope of the present invention is made combining the following components in the indicated percentages.

| Components | Percentage |
| --- | --- |
| Latex floor enamel No. 631-91 (manufactured by Fuller-O'Brien) | 75% |
| Texture paint comprised of the following components added in the indicated percentages: | 25% |
| Titanium Dioxide Type I | 2% |
| Calcium Carbonate | 9% |
| Silica and silicates | 40% |
| Vinyl acetate/ethylene/vinyl chloride resin | 3% |
| Water | 46% |

These components are combined to produce a paint composition which, when applied to a surface, dries to a putty-like consistency. The paint composition of Example 1 provides acceptable wear characteristics in the areas of resistance to peeling, fading, and resistance to typical weather conditions.

EXAMPLE 3

A paint composition within the scope of the present invention is made combining the following components in the indicated percentages.

| Components | Percentage |
| --- | --- |
| Latex enamel No. 631-91 (manufactured by Fuller-O'Brien) | 75% |
| Texture paint comprised of the following components added in the indicated percentages: | 25% |
| Titanium dioxide Type I | 5% |
| Calcium carbonate | 13% |
| Silica and silicates | 60% |
| Vinyl acetate/ethylene/vinyl chloride resin | 7% |
| Water | 15% |

These ingredients are combined to produce a paint composition which, when applied to a surface, dries to a putty-like consistency. The paint composition of Example 2 provides acceptable wear characteristics in the areas of resistance to peeling, fading, and resistance to typical weather.

EXAMPLE 4

A paint composition within the scope of the present invention is made by combining the following components in the indicated percentages.

| Components | Percentage |
| --- | --- |
| Latex enamel No. 631-91 as manufactured by Fuller-O'Brien | 25% |
| Texture paint composition, as more fully described in Example 1 | 75% |

These components are combined to produce paint composition with an extremely thick putty-like consistency upon being applied to a surface and being allowed to dry.

EXAMPLE 5

A paint composition within the scope of the present invention is made by combining the following components in the indicated percentages.

| Components | Percentage |
| --- | --- |
| Latex enamel No. 631-91 as manufactured by Fuller-O'Brien | 95% |
| Texture paint composition, as more fully described in Example 1 | 5% |

The components above may be combined to produce a paint composition which has a slightly putty-like texture upon being applied to a surface and being allowed to dry.

EXAMPLE 6

A paint composition within the scope of the present invention was made by combining the following components in the indicated percentages.

| Components | Percentage |
| --- | --- |
| Latex smooth white texture paint (manufactured by Fuller-O'Brien) | 25% |
| Latex floor enamel comprised of the following components added in the indicated percentages: | 75% |
| Titanium Dioxide Type IV | 24.1% |
| Acrylic resin | 31.9% |
| Glycols | 5.2% |
| Water | 62.9% |

These components were combined to form a paint composition which, when applied to a surface, dried to a putty-like consistency. The paint composition of Example 6 was applied to a series of gas meters and was found capable of indicating tampering with those gas meters. This paint composition showed acceptable wear characteristics in the areas of resistance to peeling, fading, and resistance to weather.

EXAMPLE 7

A paint composition within the scope of the present invention is made by combining the following components in the indicated percentages.

| Components | Percentage |
| --- | --- |
| Latex-smooth white texture paint (manufactured by Fuller-O'Brien) | 25% |
| Latex floor enamel comprised of the following components added in the indicated percentages: | 75% |
| Titanium Dioxide Type IV | 18% |
| Acrylic resin | 18% |
| Glycols | 3% |
| Water | 61% |

These components are combined to form a paint composition which, when applied to a surface, dried to a putty-like consistency. The paint composition provides acceptable wear characteristics in the areas of resistance to peeling, fading, and resistance to typical weather conditions.

EXAMPLE 8

A paint composition within the scope of the present invention is made by combining the following components in the indicated percentages.

| Components | Percentage |
| --- | --- |
| Texture paint (manufactured by Fuller-O'Brien) | 25% |
| Latex floor enamel comprised of the following components added in the indicated percentages: | 75% |
| Titanium Dioxide Type IV | 40% |
| Acrylic resin | 40% |
| Glycols | 9% |
| Water | 11% |

These components are combined to form a paint composition which, when applied to a surface, dried to a putty-like consistency. The paint composition provides acceptable wear characteristics in the areas of resistance to peeling, fading, and resistance to typical weather conditions.

EXAMPLE 9

A paint composition within the scope of the present invention was made by combining the following components in the indicated percentages.

| Components | Percentage |
| --- | --- |
| Titanium Dioxide Type I | 0.9% |
| Titanium Dioxide Type IV | 18.0% |
| Calcium Carbonate | 2.9% |
| Silica and silicates | 11.6% |
| Vinyl acetate/ethylene/vinyl chloride resin | 1.2% |
| Acrylic Resin | 18.2% |
| Glycols | 3.0% |
| Water | 44.2% |

These components were combined to produce a paint composition which, when applied to a surface, dried to a putty-like consistency. The paint composition of Example 9 was applied to a series of gas meters and was found capable of indicating tampering with those gas meters. In addition, the paint composition was found to have acceptable wear characteristics in the areas of resistance to peeling, fading, and resistance to weather.

EXAMPLE 10

A paint composition within the scope of the present invention is made by combining the following components in the indicated percentages.

| Components | Percentage |
| --- | --- |
| Titanium Dioxide Type I | 0.5% |
| Titanium Dioxide Type IV | 13.5% |
| Acrylic Resin | 13.5% |
| Glycols | 2.25% |
| Calcium Carbonate | 2.25% |
| Silica and silicates | 10% |
| Vinyl acetate/ethylene/vinyl chloride resin | 0.75% |
| Water | 57.25% |

These components are combined to form a paint composition which, when applied to a surface, dried to a putty-like consistency. The paint composition provides acceptable wear characteristics in the areas of resistance to peeling, fading, and resistance to typical weather conditions.

EXAMPLE 11

A paint composition within the scope of the present invention is made by the combining the following components in the indicated percentages.

| Components | Percentages |
| --- | --- |
| Titanium Dioxide Type I | 1.25% |
| Titanium Dioxide Type IV | 30% |
| Acrylic resin | 30% |
| Glycols | 6.75% |
| Calcium carbonate | 3.25% |
| Silica and silicates | 15% |
| Vinyl acetates/ethylene/vinyl chloride resin | 1.75% |
| Water | 12% |

These components are combined to form a paint composition which, when applied to a surface, dried to a putty-like consistency. The paint composition provides acceptable wear characteristics in the areas of resistance to peeling, fading, and resistance to typical weather conditions.

EXAMPLE 12

A paint composition within the scope of the present invention is made by the combining the following components in the indicated percentages.

| Components | Percentages |
| --- | --- |
| Titanium Dioxide Type I | 1.25% |
| Titanium Dioxide Type IV | 30% |
| Acrylic resin | 30% |
| Glycols | 6.75% |
| Calcium carbonate | 3.25% |
| Silica and silicates | 15% |
| Vinyl acetates/ethylene/vinyl chloride resin | 1.75% |
| Zinc Oxide | 2.00% |
| Water | 10% |

These components are combined to form a paint composition which, when applied to a surface, dried to a putty-like consistency. The paint composition provides acceptable wear characteristics in the areas of resistance to peeling, fading, and resistance to typical weather conditions. The paint is also detectable under ultraviolet light.

EXAMPLE 13

A paint composition within the scope of the present invention is made by combining the following components in the indicated percentages.

| Components | Percentage |
| --- | --- |
| Titanium Dioxide Type I | 0.5% |
| Titanium Dioxide Type IV | 13.5% |
| Acrylic Resin | 13.5% |
| Glycols | 2.25% |
| Calcium Carbonate | 2.25% |
| Silica and silicates | 10% |
| Vinyl acetate/ethylene/vinyl chloride resin | 0.75% |
| Zinc Oxide | 6.50% |
| Water | 50.75% |

These components are combined to form a paint composition which, when applied to a surface, dried to a putty-like consistency. The paint composition provides acceptable wear characteristics in the areas of resistance to peeling, fading, and resistance to typical weather conditions. The paint is also detectable under ultraviolet light.

EXAMPLE 14

A paint composition within the scope of the present invention is made by combining the following components in the indicated percentages.

| Components | Percentages |
| --- | --- |
| Titanium Dioxide Type I | 1.25% |
| Titanium Dioxide Type IV | 10% |
| Acrylic resin | 10% |
| Glycols | 2.25% |
| Calcium carbonate | 3.35% |
| Silica and silicates | 15% |
| Vinyl acetate/ethylene/vinyl chloride resin | 1.75% |
| Water | 56.5% |

These components were combined to form a paint composition which, when applied to a surface, dried to a putty-like consistency. The paint composition provides acceptable wear characteristics in the areas of resistance to peeling, fading, and resistance to typical weather conditions.

EXAMPLE 15

A paint composition within the scope of the present invention is made by combining the following components in the indicated percentages.

| Components | Percentages |
| --- | --- |
| Titanium Dioxide Type I | 1% |
| Titanium Dioxide Type IV | 15% |
| Acrylic resin | 15% |
| Glycols | 3% |
| Calcium carbonate | 2.25% |
| Silica and silicates | 12.5% |
| Vinyl acetate/ethylene/vinyl chloride resin | 1% |
| Water | 50% |

These components are combined to form a paint composition which, when applied to a surface, dried to a putty-like consistency. The paint composition provides acceptable wear characteristics in the areas of resistance to peeling, fading, and resistance to typical weather conditions.

EXAMPLE 16

A paint composition within the scope of the present invention is made by combining the following components in the indicated percentages.

| Components | Percentages |
| --- | --- |
| Titanium dioxide Type IV | 20% |
| Silica and silicates | 15% |
| Acrylic resin | 30% |
| Glycols | 6% |
| Water | 29% |

These components are combined to form a paint composition which, when applied to a surface, dried to a putty-like consistency. The paint composition provides acceptable wear characteristics in the areas of resistance to peeling, fading, and resistance to weather.

As is apparent from the discussion above, the present paint compositions and method of use accomplishes all of the objects of this invention. The present invention provides a method of effectively detecting movement between adjoining surfaces which is particularly useful in detecting tampering with utility meters. The detection method of the present invention is inexpensive and simple to apply and use. The present invention is not easily detectable in advance in cases where the color of the paint composition is made to match the underlying surface and the invention is flexible in use and can be applied to a wide range of surfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method of providing a security protection system for detecting movement between at least two adjacent surfaces, the method comprising the steps of:
    (a) obtaining a fluid sealant paint composition which, when dry, forms a seal having putty-like consistency, which seal produces a usually detectable irreparable tear when two or more adjacent surfaces that have been sealed with the sealant paint composition are moved with respect to one another;
    (b) matching surface characteristics of the fluid sealant composition when dry with surface characteristics of said adjacent surfaces; and
    (c) applying the sealant paint composition to a portion of the surfaces which are adjacent to one another so that the sealant paint composition extends over the joint between the surfaces.

2. A method of providing a security protection system for detecting movement between at least two adjacent surfaces as defined in claim 1 further comprising the step of matching the color of the fluid sealant paint composition with the color of the surfaces to which it is to be applied.

3. A method of providing a security protection system for detecting movement between at least two adjacent surfaces as defined in claim 1 wherein the fluid sealant paint composition comprises a paint base and a means for imparting a putty-like consistency to said paint base upon drying.

4. A method of providing a security protection system for detecting movement between at least two adjacent surfaces as defined in claim 3 wherein said means for imparting a putty-like consistency to said paint based upon drying comprises a thickening agent added to said paint base.

5. A method of providing a security protection system for detecting movement between at least two adjacent surfaces as defined in claim 4 wherein said thickening agent comprises a texture paint.

6. A method of providing a security protection system for detecting movement between at least two adjacent surfaces as defined in claim 1 wherein said seal is detectable under ultraviolet light.

7. A method of providing a security protection system for detecting movement between at least two adjacent surfaces as defined in claim 1 wherein said seal is detectable under infrared light.

8. A method of providing a security protection system for detecting movement between at least two adjacent surfaces as defined in claim 6, further comprising the step of viewing the joint between the surfaces under ultraviolet light.

9. A method of providing a security protection system for detecting movement between at least two adjacent surfaces as defined in claim 7, further comprising the step of viewing the joint between the surfaces under infrared light.

10. A method of providing a security protection system for detecting tampering with utility meters comprising the steps of:
    (a) obtaining a fluid paint composition which, when dry, forms a seal having putty-like consistency, and produces a visually detectable irreparable scar when two or more adjacent surfaces that have been painted with the paint composition are moved with respect to one another;
    (b) matching the surface characteristics of the fluid paint composition when dry with the surface characteristics of the underlying surfaces;
    (c) applying said paint composition to one or more joints on a utility meter; and
    (d) checking the joints to determine whether any tears exist in the seal.

11. A method of providing a security protection system for detecting tampering with utility meters as defined in claim 10 further comprising the step of packing the paint composition of step (a) such that individual packages contain only enough of the paint composition to secure a single utility meter.

12. A method of providing a security protection system for detecting tampering with utility meters as defined in claim 11 further comprising the steps of:
    placing control numbers on each package containing the paint composition; and
    recording said control numbers together with the identity of the meter to which it is applied.

13. A method of providing a security protection system for detecting tampering with utility meters as defined in claim 10 further comprising the step of adding a substance to the paint composition which is detectable under ultraviolet light.

14. A method of providing a security protection system for detecting tampering with utility meters as defined in claim 13 further comprising a step of viewing the joints under ultraviolet light.

15. A method of providing a security protection system for detecting tampering with utility meters as defined in claim 10 further comprising a step of adding a substance to the paint composition which is detectable under infrared light.

16. A method of providing a security protection system for detecting tampering with utility meters as defined in claim 15 further comprising a step of viewing the joints under infrared light.

17. A fluid sealant composition for use in providing a security protection system for detection movement between adjoining surfaces comprising:
    a paint base;
    means for matching the surface characteristics of the fluid sealant composition when dry with the surface characteristics of the underlying surface; and means for imparting a putty-like consistency to said paint base upon drying, such that when the fluid sealant composition has been applied to adjoining surfaces and has dried, any movement between the adjoining surfaces results in an irreparable rupture of the surface of the dried sealant composition which is visually detectable.

18. A sealant composition as defined in claim 17 wherein said means of imparting a putty-like consistency to said paint base upon drying comprises a thickening agent added to said paint base.

19. A sealant composition as defined in claim 18 wherein said thickening agent contains silica.

20. A sealant composition as defined in claim 18 wherein said thickening agent contains silicates.

21. A sealant composition as defined in claim 20 wherein the ratio of the paint base to the thickening agent is from about 1:1 to about 20:1.

22. A sealant composition as defined in claim 21 further comprising one or more titanium dioxide pigments.

23. A sealant composition as defined in claim 17 wherein said paint base comprises a pigment and a carrier vehicle.

24. A sealant composition as defined in claim 23 wherein said pigment is titanium dioxide.

25. A sealant composition as defined in claim 24 wherein said carrier vehicle is comprised of acrylic resin, glycols and water.

26. A sealant composition as defined in claim 25 wherein said carrier vehicle is comprised of from about 25% to about 40% acrylic resin, from about 3% to about 9% glycols, and the remainder portion of the vehicle being water.

27. A sealant composition as defined in claim 20 wherein said thickening agent comprises titanium dioxide in the range of from about 2% to about 5%.

28. A sealant composition as defined in claim 27 wherein said thickening agent further comprises calcium carbonate in the range of from about 9% to about 13%.

29. A sealant composition as defined in claim 28 wherein said thickening agent further comprises silica and silicates in the range of from about 40% to about 50%.

30. A sealant composition as defined in claim 29 wherein said thickening agent further comprises vinyl acetate, ethylene and vinyl chloride resin in the range of from about 2% to about 8%.

31. A sealant composition as defined in claim 30 further comprising water.

32. A sealant composition as defined in claim 17 further comprising a material capable of detection under infrared light.

33. A sealant composition as defined in claim 17 further comprising a material capable of detection under ultraviolet light.

34. A sealant composition as defined in claim 33 wherein said material capable of detection under ultraviolet light is zinc oxide.

* * * * *

UNITED STATES PATENT AND TRADEMARK OFFICE
CERTIFICATE OF CORRECTION

PATENT NO. : 4,744,328
DATED : May 17, 1988
INVENTOR(S) : D. Lynn Stevens et al.

It is certified that error appears in the above-identified patent and that said Letters Patent are hereby corrected as shown below:

Column 7, line 7, "trearing" should be --tearing--
Column 8, line 12, "potential defect" should be --potentially affect--
Column 15, line 31, "usually" should be --visually--
Column 15, lines 58-59, "paint based" should be --paint base--

Signed and Sealed this

Third Day of January, 1989

Attest:

DONALD J. QUIGG

*Attesting Officer*     *Commissioner of Patents and Trademarks*